United States Patent [19]

Klees

[11] Patent Number: 5,283,661
[45] Date of Patent: Feb. 1, 1994

[54] METHOD AND APPARATUS FOR ASSISTING IN THE INSTALLATION OF A FACSIMILE MACHINE

[75] Inventor: Kevin J. Klees, Rochester, N.Y.

[73] Assignee: Eastman Kodak Company, Rochester, N.Y.

[21] Appl. No.: 585,778

[22] Filed: Apr. 16, 1991

[51] Int. Cl.⁵ .................................................. H04N 1/00
[52] U.S. Cl. ...................................... 358/406; 358/400; 358/434
[58] Field of Search ............... 358/400, 404, 406, 444, 358/434; 379/100; 395/12, 908, 919; 364/468

[56] References Cited

U.S. PATENT DOCUMENTS 4,570,035  2/1986  Pinede et al. ................... 179/99
4,916,637  4/1990  Allen et al. ...................... 364/468

OTHER PUBLICATIONS

Publication No. JP2105749, Apr. 18, 1990, Title-Electronic Mail Terminal.
Publication No. JP1084973, Mar. 3, 1989, Title-Printer For Instruction Manual.
Publication No. JP3029460, Feb. 7, 1991, Title-Image Communication Equipment.
Publication No. JP62159967, Jul. 15, 1987, Title-Control Information Output System For Facsimile Equipment.
Publication No. JP3239060, Oct. 24, 1991, Title-Facsimile Equipment.

Primary Examiner—Edward L. Coles, Sr.
Assistant Examiner—Thomas D. Lee
Attorney, Agent, or Firm—Thomas H. Close

[57] ABSTRACT

Method and apparatus for detecting that a facsimile machine is being installed with stored information within the machine being used to aid the installer during installation and/or operation using either image and text information or verbal information stored in the memory of the facsimile machine.

12 Claims, 11 Drawing Sheets

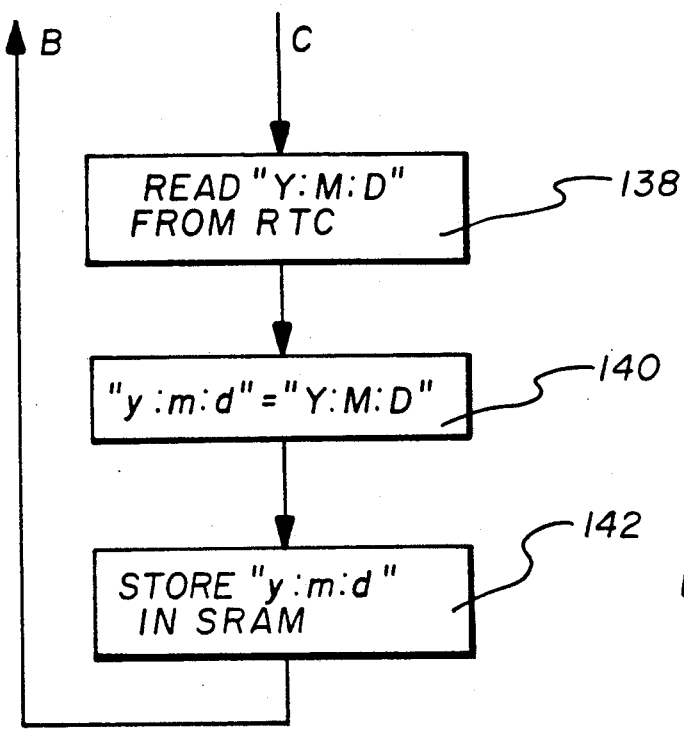

HELP

TO SEND A DOCUMENT: PLACE IT FACE DOWN IN THE INPUT TRAY, ENTER THE PHONE NUMBER WITH THE KEYPAD, AND PRESS THE SEND KEY. • • • • • • •

FIG. 5

MODEL NUMBER: XYZ678
SERIAL NUMBER: 776312
REVISION: 1.02

FOR INSTALLATION HELP
PRESS "Y"

OTHERWISE PRESS "N"

MANUFACTURED: 89-02-12
WARRANTY DATE: 89-06-03

RETAIN THIS SHEET FOR
YOUR RECORDS

FIG. 6

PRESS "SET TIME" TO CHANGE
CURRENT TIME, THEN PRESS
THE NUMBERS 0-9 FOR THE YEAR,
MONTH, DAY, HOUR, AND MINUTE;

EXAMPLE:

PRESS "SET TIME"
   PRESS "89"    (1989)
   PRESS "10"    (OCTOBER)
   PRESS "02"    (OCTOBER 2)
   PRESS "09"    (9:00 AM)
   PRESS "30"    (9:30 AM)
   PRESS "Y"

FIG. 7

PRESS "MODE" THEN THE "3" KEY,
THIS WILL BEGIN ACCEPTING
THE PHONE NUMBER AT YOUR
LOCATION;

EXAMPLE:
   PRESS "MODE"
   PRESS "3"
   PRESS "7167260000"
   PRESS "Y"

FIG. 8

CONNECT THE PHONE LINE
TO THE PLUG LABELED
"LINE" ON THE REAR OF
THIS MACHINE.

FIG. 9

METHOD AND APPARATUS FOR ASSISTING IN THE INSTALLATION OF A FACSIMILE MACHINE

TECHNICAL FIELD

This invention generally relates to facsimile machines and, more particularly, to facsimile apparatus which are capable of assisting in its initial installation and aid the user during operation.

BACKGROUND OF THE INVENTION

Currently, most facsimile equipment come with a manual that has instructions for installation and setup of the machine. Purchasers that are unfamiliar with fax machines often find the instructions difficult and unwieldly and many read instructions only as a last resort.

Features offered in facsimile machines have steadily grown in complexity. Delayed sending, broadcast sending, calling other machines to request transmission and other enhanced options are now common. As the number and complexity of these enhancements increase, it becomes more difficult for a user to take advantage of them. Current instruction manuals require many pages to describe selecting and customizing the enhanced features of these machines.

As facsimile machines having even more advanced features and higher imaging quality emerge, one can clearly expect the initial installation and programming steps to become more complex.

DISCLOSURE OF THE INVENTION

The present invention, a preferred embodiment, comprises a stored program in a facsimile apparatus that provides information to assist an installer. A real time clock is used to provide elapsed time information. The elapsed time information is compared with a previously stored time period to determine if the elapsed time information is greater than the stored time period in which case a signal is generated. A memory holding the stored installation instruction in the form of images and text is addressed in response to the generated signal. The stored installation instructions are directed to the printer to provide a hardcopy of the installation instructions.

In another embodiment, the instructions are stored in the form of verbal instructions in a voice ROM (Read Only Memory) and in response to the signal from the comparing means, the stored instructions are directed to a telephone handset so as to communicate the verbal instructions to the installer.

In other embodiments, additional "help" information is stored in memory and can provide further information to either the installer or the operator by requesting it via a keyboard.

Accordingly, a facsimile machine using this invention would include a real time clock, a small amount of read/write non-volatile memory and a non-volatile read only memory. It is necessary that the clock operate at all times (i.e. battery powered). During manufacture and testing, the real time clock would be set to the current time and date. In addition, the current date would be stored in the read/write non-volatile memory, requiring perhaps 6 bytes. After test, the machine would be powered off, shipped and possibly stored in distribution channels and inventory. During this time period, the clock would continue to operate, and the data stored in the non-volatile memory would be maintained.

Subsequently, each time the machine is powered up, the current time and date from the real time clock would be compared to the data stored in the read/write non-volatile memory. Comparison would reveal the elapsed time from the last time the machine was turned on and the current operation of the machine. If the elapsed time is less than some fixed time period (i.e. 1 week), the new time would be stored in the read/write non-volatile memory and the normal operation of the machine would proceed. During normal operation of the machine, the data stored in the non-volatile memory would be updated every 24 hours.

When the elapsed time exceeds the limit, it would be assumed that (for example) the machine has been moved to, or installed in a new location. In response to the assumption, an installation sequence would begin by printing an introduction sheet indicating the model, serial number and features of the machine, and the steps that the installer must perform before proceeding. A series of steps could be outlined either on the display or on a printout requesting the user to enter the necessary information before normal operation could continue.

BRIEF DESCRIPTION OF THE DRAWINGS

FIGS. 4A-D illustrate a flowchart for the controlling software;

FIG. 5 shows a sample help page output;

FIG. 6 shows a sample of a model number and serial number output page;

FIG. 7 shows a sample help sheet instructing the installer how to set the current local time;

FIG. 8 shows a sample help sheet instructing the installer how to set the local phone number; and FIG. 9 shows a sample help sheet instructing the installer how to connect the machine to the phone line.

DETAILED DESCRIPTION OF THE INVENTION

Figure 1:
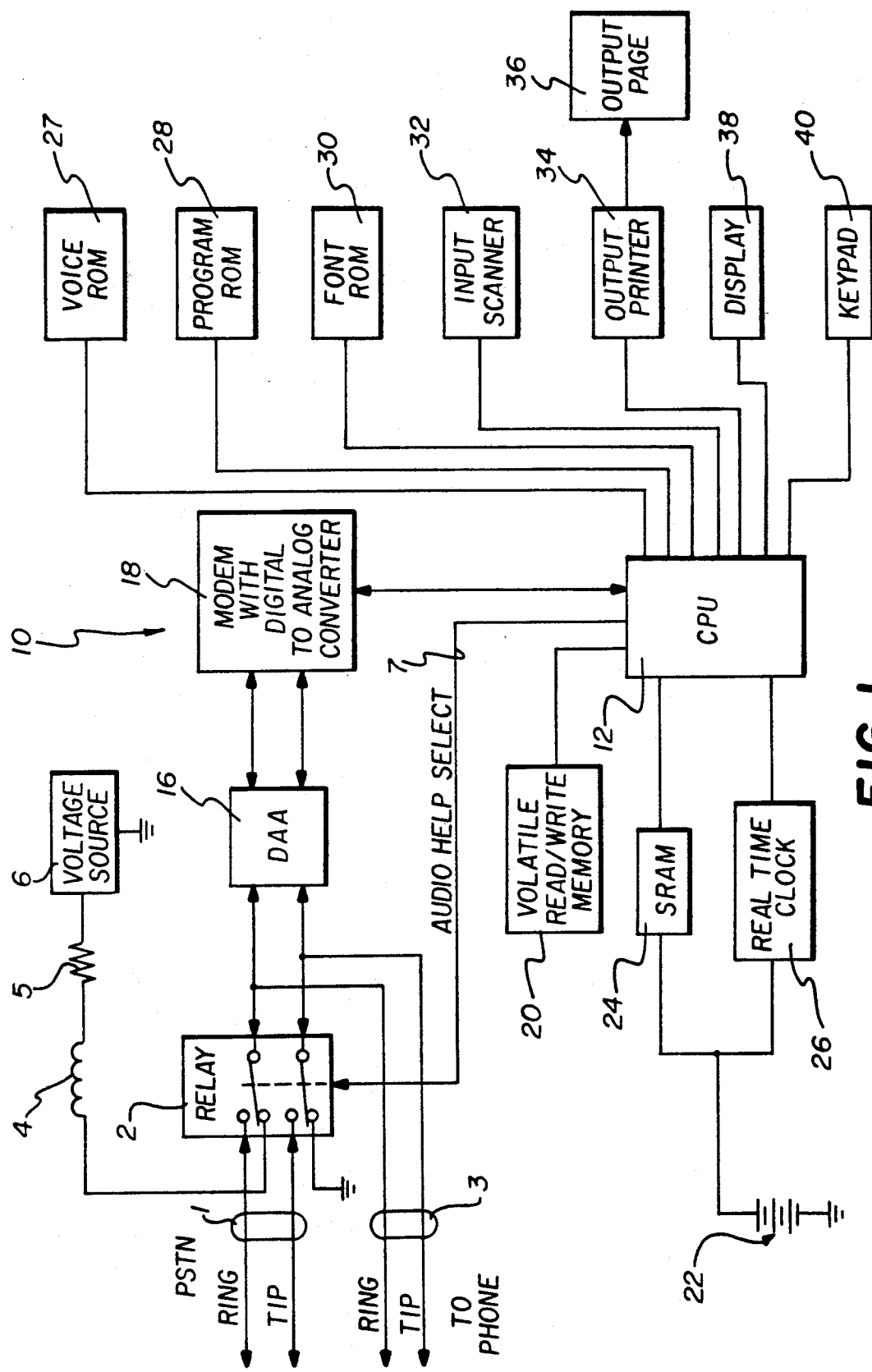
FIG. 1 is a block diagram of a facsimile machine according to the present invention.

FIG. 1 illustrates a block diagram of the inventive system 10. A central processing unit 12 controls all functions of the machine. The public switched telephone network (PSTN) is connected to the machine via the signal pair 1. A double pole double throw (DPDT) relay 2 is connected as shown, with the common terminals of this relay are connected to data access arrangement (DAA) 16 and to an external phone (not shown) via the wire pair 3. Relay 2 has two positions; "normal", and "audio help", a position is selected by the audio help select signal on line 7 from CPU 12.

Relay 2 is shown in the "audio help" position. This position connects DC voltage source 6 thru current limiting resistor 5 and AC blocking inductor 4 to the signal pair 3. When relay 2 is in the "audio help" position, voltage source 6 supplies DC power to the external phone. When relay 2 is in the "normal" position signal pair 1 from the PSTN is connected via signal pair 3 to the external phone and to data access arrangement (DAA) 16.

Modem 18 has the capability to interface over the PSTN with other facsimile machines using standard and well known protocols. Also, modem 18 can detect and generate dual tone multiple frequency (DTMF) signals used for phone number dialing. Modem 18 can also generate audio signals from digitized speech data stored in read only memory 27.

Volatile read/write memory 20 is provided for normal software calculations, and storage of received images. A battery 22 is provided to maintain accurate data in static random access memory 24 (SRAM). A real time clock 26 (RTC) also operates from the battery power and provides continuous time information. Battery 22 provides for reliable operation of the SRAM 24 and the RTC 26 even while power to the CPU 12 and other devices is not present. The real time clock 26 is programmed in a 24 hour format (i.e. the hour variable increments from 0 to 23). It should be noted that the SRAM 24 could be replaced by other forms of non-volatile memory devices, such as: EEPROM, harddisk, or ferroelectric memory.

A read only memory 28 (ROM) contains operating software, and a second ROM 30 contains font data used in printing hardcopy output page 36 containing installation information using the output printer 34. Output printer 34 produces output page 36 which may also comprise received image data, or other information. Input scanner 32 is provided for reading documents into the facsimile machine for transmission. User or operator interface with this machine is provided via a display 38 and a keypad 40.

Figure 2:
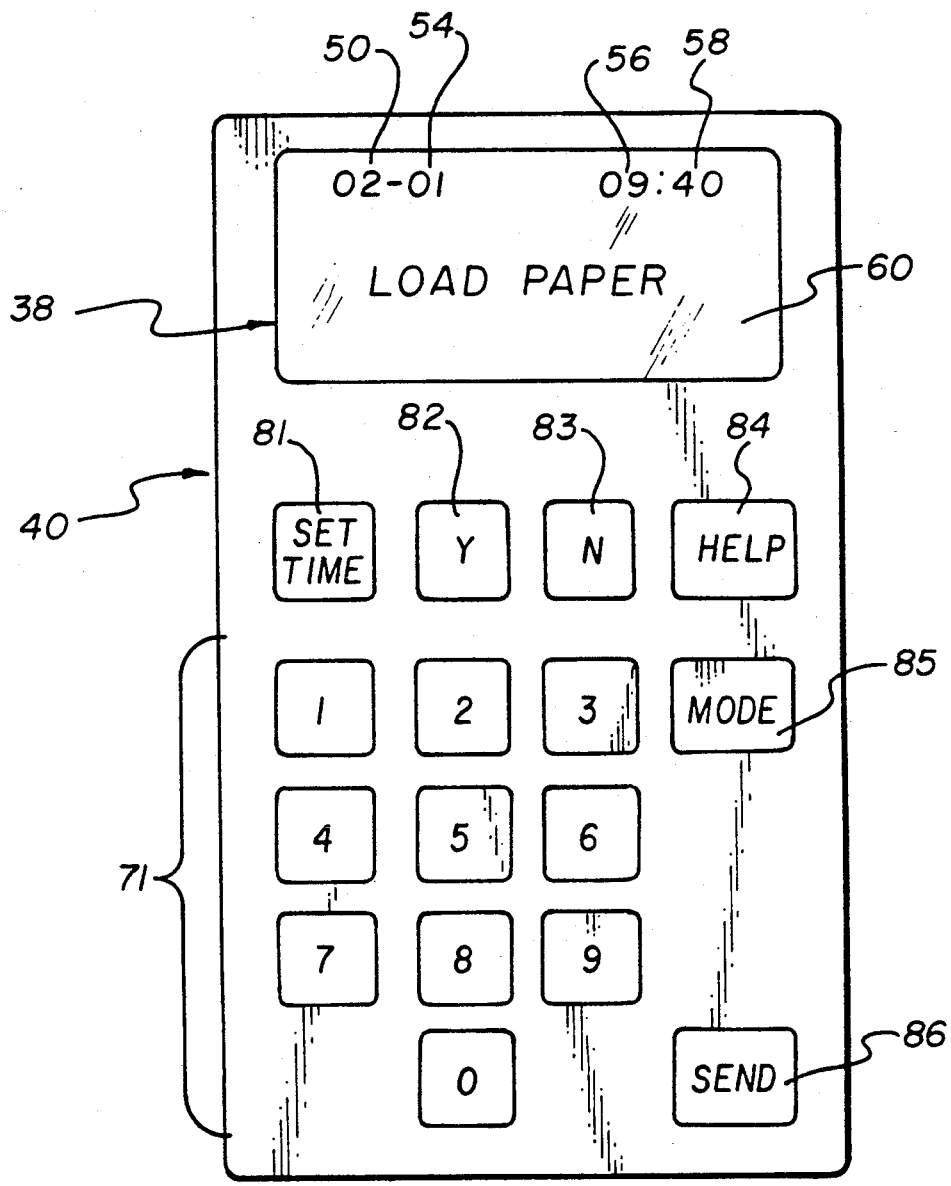
FIG. 2 is a view of the display panel and keypad used by the operator.

FIG. 2 depicts the display 38 and keypad 40 used for user interfacing. The current month is displayed at location 50, the current day at 54, current hour at 56, and the current minute at location 58. A message is located at position 60, as illustrated by the example message "LOAD PAPER". Ten numeric keys 71 are present on the keypad 40 for entering phone numbers, etc. Also, there are 5 function keys 81-85. A send button 86 completes the buttons on the keypad.

Figure 3:
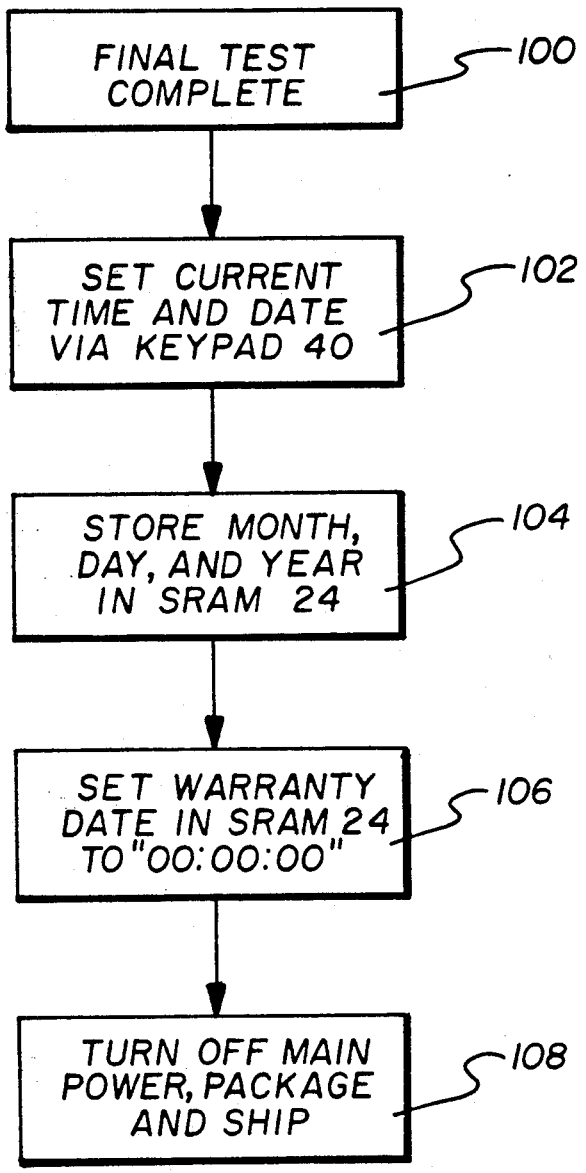
FIG. 3 illustrates a sequence of steps performed during final assembly of the inventive apparatus.

FIG. 3 depicts a series of steps performed along with other final testing steps during manufacture of this machine. After all other necessary testing steps are complete, this processes is begun at block 100 which occurs with the machine operating normally; final test complete. A first operation at block 102 consists of entering the current time and date into RTC 26 via the keypad 40 and display 38. This is accomplished by hitting key 81 labeled "SET TIME". CPU 12 responds by writing the message "ENTER DATA" on display 38 at location 60. The manufacturer now enters the year, month, date, hour, and minute using the numeric keys 70-79. As each of the ten digits are entered, CPU 12 verifies, displays, and programs them into the real time clock (RTC) 26. After ten digits are entered, the set time function is complete and CPU 12 writes the message "READY" on display 38 at location 60.

Block 104 in FIG. 3 illustrates the next step in the manufacturing process. The year, month, and date programmed into RTC 26 is read from RTC 26 and stored into battery backed up SRAM 24 taking up six bytes of memory. In the next step block 106, a "warranty date" is set to "00:00:00" and stored in the SRAM 24. Finally, in block 108 the machine is turned off, packaged and shipped. After this step, the RTC 26 continues to keep the correct time.

FIGS. 4A-D illustrate in a flowchart the software sequence followed from the time the machine is turned on.

Figure 4A:
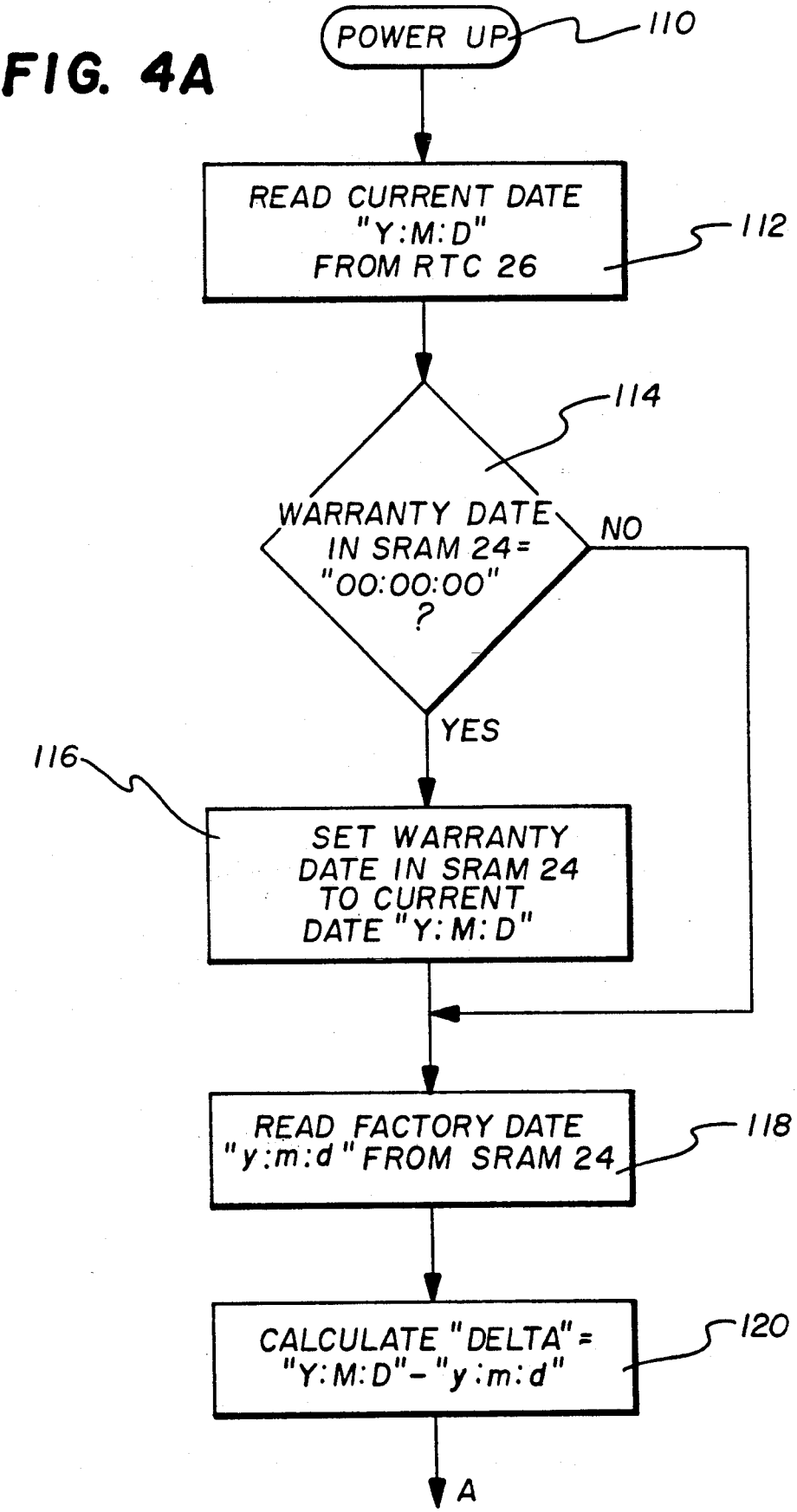

Block 110 in FIG. 4A represents initial power up steps well known in the art including self tests and setting feature selections to defaults. Block 112 reads the current year designated "Y", the current month "M" and the current day "D" from the real time clock (RTC) 26. Next, block 114 checks to see if the "warranty date" is correctly stored in SRAM 26. If this variable is equal to "00:00:00" the function in block 116 is performed. Block 116 replaces the zero value of "warranty date" with the current date "Y:M:D" and stores this result in SRAM 24. This sequence of updating the "warranty date" will only occur once in the lifetime of this machine. Block 118 reads the "factory date" designated "y:m:d" from the SRAM 24. These are the values stored during the operations of FIG. 3.

In block 120 a calculation of the difference in days between "Y:M:D" and "y:m:d" is performed. This calculation is well known in the art. The result is "DELTA" which has units of days. Block 122 performs a comparison of "DELTA" to an arbitrary predefined limit (taken here to be 7 days).

Figure 4B:
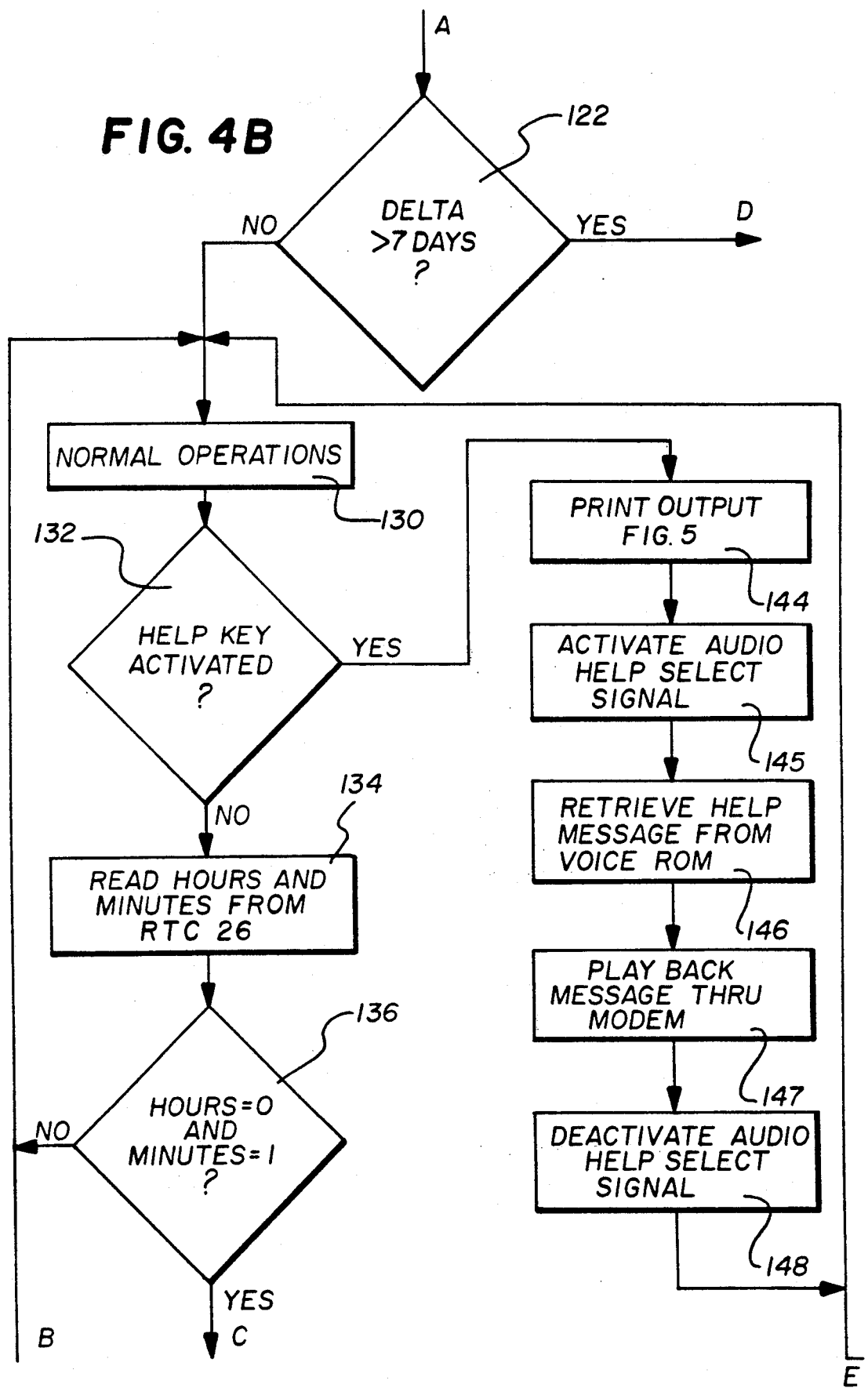
Figure 4D:
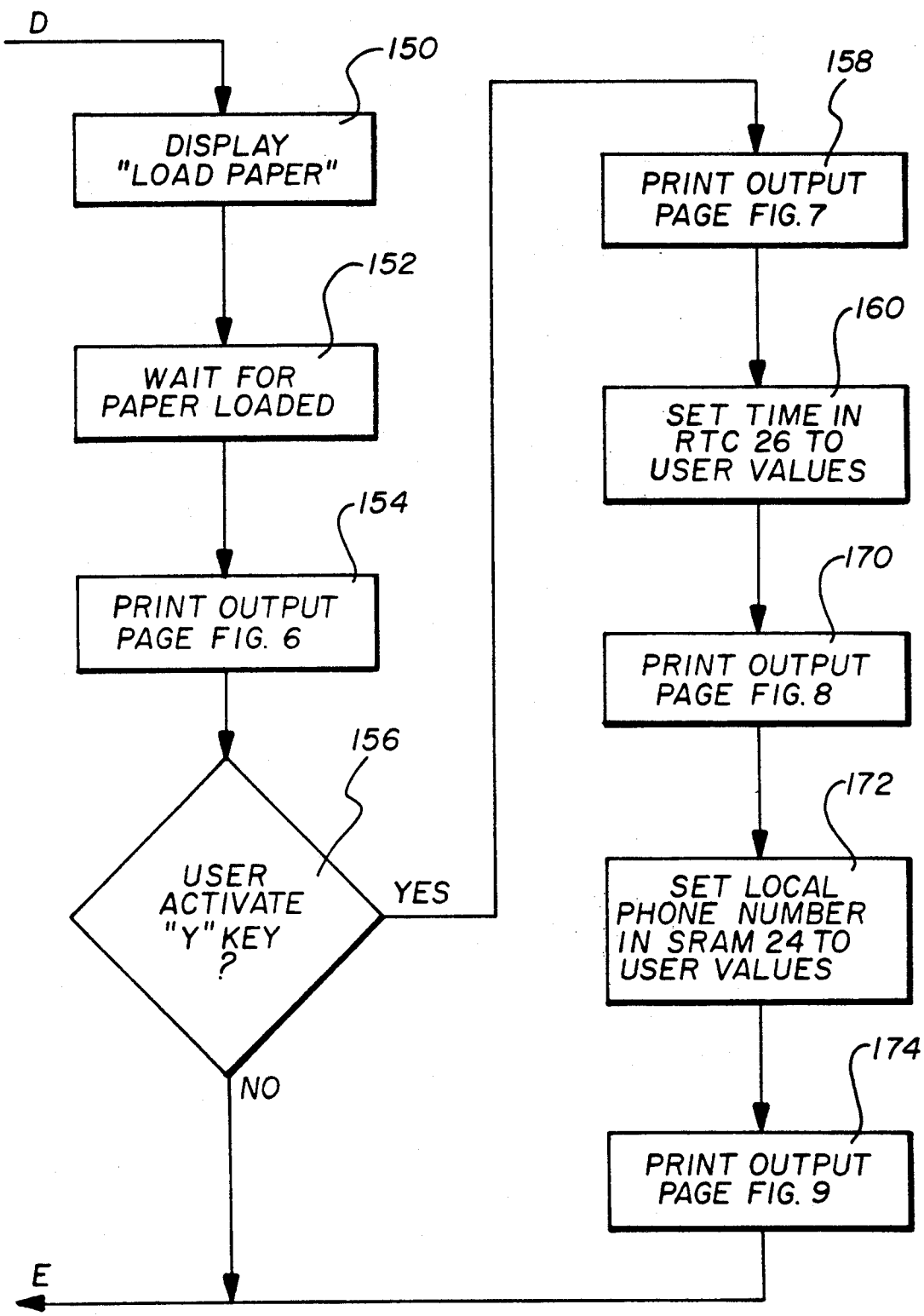

FIGS. 4B and 4D detail the two possible sequences started in FIG. 4B. If "DELTA" is not greater than 7 days, block 130 is next and represents any normal facsimile machine operation including receiving and transmitting documents. In block 132, a check is made to see if the user has hit the "HELP" key 84 in FIG. 2. If the help key is struck execution proceeds at block 144 to be described later. If the "HELP" key is not struck the current hour and minute is read from the RTC 26 in block 134. Block 136 compares the current time to one minute past midnight. At any time during the day other than one minute past midnight, the control sequence returns to block 130 and performs normal facsimile machine operations. At one minute past midnight, the operations in blocks 138 thru 142 are carried out. Block 138 reads the new year, month and date from RTC 26. Block 140 replaces the factory date "y:m:d" with the current date "y:m:d", and block 142 stores the factory date in the SRAM 24.

Block 144 corresponds to the action taken when the user requests help via the help button. One response is to print an output page of help data explaining the proper use of this machine, and how to select additional features. This output page would be stored in program ROM 28 in FIG. 1. A character generator algorithm would use this text data, along with font data stored in font ROM 30 in FIG. 1 to generate the output image data. Character generation is well known in the prior art and any of several methods could be used here. It should be understood that this help function could be expanded to include more pages, and to be programmed by a user. FIG. 5 depicts a possible help page, of course the specific information would vary with the type of machine, and could be printed in different languages.

An additional help function would be implemented as shown in Blocks 145-148. First, in block 145 the "audio help select" signal 7 is activated. This connects the external phone to modem 18 thru signal pair 3 and data access arrangement 16. Actions taken in block 146 retrieve an appropriate digitized help message from voice ROM 27 into volatile read/write memory 20. Block 147 depicts the playback of this message thru the digital to analog converter in modem 18. This is also well known in the art. After the playback of the message is complete "audio help select" signal 7 is deactivated to return DPDT relay 2 to the "normal" position.

While relay 2 is in the "normal" position, an operator could lift the external phone off the hook. This condition can be detected by data access arrangement 16. If the "off hook" condition persists for more than some predetermined period of time with no dialing activity, the "audio help" mode would begin automatically.

Branch "D" in FIG. 4D represents the control sequence executed when the elapsed time is greater than the arbitrary predetermined time as, for example, when an installation is detected as possibly being required. This path is taken when the machine has been turned off for more than the arbitrarily selected 7 day period in block 122. The first step of the installation procedure is executed in block 150 by displaying a "LOAD PAPER" message on the display 38 at location 60. Block 152 waits for the user to respond by loading paper into the machine. The combination of blocks 150 and 152 could also prompt the user to install other consumables necessary for printing (i.e. toner, etc.). Next, in block 154, a page is output using the above mentioned character generator algorithm. This page would contain useful information such as the warranty date for the machine, a serial number, etc. FIG. 6 illustrates one possible format for this page. This page would contain a prompt to the user allowing them to request or deny additional assistance with the installation procedure. Block 156 would wait for the user to strike either the "Y" key 82 (FIG. 2) or the "N" key on keypad 40. If the user hit the "N" key 83 (FIG. 2), operation would proceed to the normal operation block 130.

If the user accepted additional installation assistance by hitting the "Y" key 82 (FIG. 2) in block 156, processing would proceed by printing another output page according to block 158. This page might explain that the user needs to correct the current time setting to reflect local time zone differences and prompt the user on the necessary steps. FIG. 7 illustrates some possible formats for this sheet. Block 160 would accept these new values from the numeric keys 71 on keypad 40, verify these values, and set the current time in RTC 26 accordingly.

An additional step shown in block 170 would be to print another output page (illustrated in FIG. 8). This page would prompt the user to enter the local phone number to be used in identifying this machine to calling, or called machines. Block 172 would again accept input from the user via the numeric keys 71 on keypad 40. These values would then be stored in SRAM 24 to be used for normal facsimile operations.

Block 174 would print a final output page describing the connection of the phone line to the machine. FIG. 9 illustrates one possible format for this page.

It is understood that more pages, and more prompts for action could be incorporated to setup additional features of this machine.

ADVANTAGES AND INDUSTRIAL APPLICABILITY

This invention will aid the installer with the initial installation and the operator with the operation of facsimile machines as the machine includes advanced features and higher imaging quality. The use of on board installation instructions and specific "help" features make it easier for both the installer and operator. Lost, damaged or misplaced instruction manuals will no longer present problems associated with machine use. Updated features can be provided at the time of manufacture without changing or obsoleting previously printed manuals.

What is claimed is:

1. A facsimile apparatus capable of providing information to assist an installer, said facsimile apparatus comprising:
   a) printing means for printing image and text information including installation instructions;
   b) clock means for providing elapsed time information indicating a length of time since the facsimile apparatus was last turned off;
   c) memory means for storing the installation instruction in the form of images and text;
   d) comparing means for comparing the elapsed time information received from said clock means with a previously stored time period, and for generating a first signal when the elapsed time is grater than said previously stored time period indicating that the facsimile apparatus may require installing;
   e) addressing means for addressing said memory means to access said installation instruction responsive to said first signal received from said comparing means;
   f) directing means for directing the installation instructions addressed by said addressing means to said printing means for printing a hard copy of the installation instructions for use by the installer; and
   g) said clock means, memory means, comparing means, addressing means, and directing means all being within a signal facsimile apparatus.

2. A facsimile apparatus as set forth in claim 1 wherein the apparatus further includes a keyboard and said memory means further includes stored help means for providing additional information to the installer when requested via said keyboard.

3. The facsimile apparatus as set forth in claim 2 wherein said memory means further includes a voice ROM for storing voice installation instructions to assist the installer audibly.

4. The facsimile apparatus as set forth in claim 3 wherein said apparatus further includes a telephone handset for providing verbal communications using said voice installation instructions stored in said voice ROM.

5. The facsimile apparatus as set forth in claim 2 wherein said memory means comprises a program ROM.

6. The facsimile apparats as set forth in claim 5 wherein the apparatus further includes a keyboard and said memory means further include stored help means for providing additional information to the installer when requested via said keyboard.

7. A facsimile apparatus capable of providing information to assist an installer in the installation of said facsimile apparatus, said facsimile apparatus comprising:
   a) a telephone handset;
   b) memory means for storing installation instruction including verbal instructions;
   c) clock means for providing elapsed time information indicating a length of time since the facsimile apparatus was last turned off;
   d) comparing means for comparing the elapsed time information received from said clock means with a previously stored time period, and for generating a first signal when the elapsed time is greater than said previously stored time period indicating that the facsimile apparatus may require installing;
   e) addressing means for addressing said memory means to access said installation instructions responsive to said first signal;

f) directing means for directing the installation instructions addressed by said addressing means to said telephone and set to communicate the verbal instructions to said installer; and g) said clock means, memory means, comparing means, addressing means, and directing means all being within a signal facsimile apparatus.

8. The facsimile apparatus as set forth in claim 7 wherein said memory means further includes image/text means for storing image and text information associated with the installation instructions.

9. The facsimile apparatus as set forth in claim 8 wherein said apparatus further includes printing means for printing said image and text information sent to it by said directing means from said memory means.

10. The facsimile apparatus as set forth in claim 8 wherein said memory means comprises a voice ROM and said image/text means comprises a program ROM.

11. A facsimile apparatus, comprising:

a) clock means for determining a time period since the facsimile apparatus has been las turned off;

b) comparing means for comparing said time period received from said clock means to a predetermined time period, and for providing predetermined installation instructions when said time period is greater than said predetermined time period, assisting in installation of the facsimile apparatus; and c) said clock means and said comparing means being within a single facsimile apparatus.

12. A facsimile apparatus as set forth in claim 11, wherein said predetermined time period includes first and second predetermined time periods, wherein said predetermined installation instructions include first and second predetermined installation instructions corresponding to said first and second predetermined time periods, respectively, and wherein said comparing means provides said first predetermined installation instruction when said time period is greater than said first predetermined time period, and provides said second predetermined installation instruction when said time period is greater than said second predetermined time period.

* * * * *